United States Patent [19]

Sharett

[11] 4,078,859
[45] Mar. 14, 1978

[54] AUTOMATIC REAR VIEW MIRROR

[76] Inventor: Terrence E. Sharett, 212 Herrontown Cir., Princeton, N.J. 08540

[21] Appl. No.: 691,361

[22] Filed: Jun. 1, 1976

[51] Int. Cl.² .................................................. G02B 17/00
[52] U.S. Cl. ..................................... 350/279; 350/281
[58] Field of Search ............... 350/281, 276 R, 279, 350/285, 277, 278, 283, 280; 250/209, 206

[56] References Cited

U.S. PATENT DOCUMENTS

| 3,475,081 | 10/1969 | Russel | 350/279 |
| 3,664,729 | 5/1972 | Moore | 350/281 |
| 3,680,951 | 8/1972 | Jordan et al. | 350/281 |
| 3,722,984 | 3/1973 | Brean | 350/280 |

FOREIGN PATENT DOCUMENTS

| 1,131,236 | 10/1968 | United Kingdom | 350/280 |

Primary Examiner—John K. Corbin
Assistant Examiner—B. W. delos Reyes

[57] ABSTRACT

A pivotal mirror adapted for use in automobiles as a rear view reflector or in medical and dental establishments and the like. Actuation of the mirror is effected by a light sensitive element employed to energize electromagnets disposed on the back face of the mirror itself as well as on a critically located portion of its stationary housing, the moving and stationary magnets serving conjointly to pivot the mirror, for example, the rear view mirror of an automobile, in order to reduce the intensity of light in the driver's eyes emanating from a following automobile. The light sensitive element extends through the pivotal mirror not being displaceable therewith whereby it is always positioned to detect any change in the incident rays falling thereon.

1 Claim, 3 Drawing Figures

AUTOMATIC REAR VIEW MIRROR

The invention relates to adjustable mirrors commonly employed in automobiles as rear view reflectors and, in particular, to such mirrors which are associated with mechanism which effect their automatic adjustment depending on the intensity and other conditions of the incident light rays emanating from nearby light sources.

In general the invention comprehends a system for automatically adjusting a reflective device including a photocell which is closely associated with the device though without being adjustable itself. The photocell energizes at least one pair of magnets one of which is actually attached to the mirror arranged to pivot within the housing. Hitherto, photocell acutated mirrors have had the photocell mechanically attached to the adjustable relfectors and are moved therewith. For example, see U.S. Pat. No. 3,000,262 which discloses a single, stationary electromagnetic and a photocell attached to the mirror.

One object of the invention is to provide an improved photocell actuated, adjustable mirror adapted for automotive use.

Other objects and advantages of the invention may be appreciated on reading the following description of one embodiment thereof which is taken in conjunction with the accompanying drawings, in which.

Figure 1:
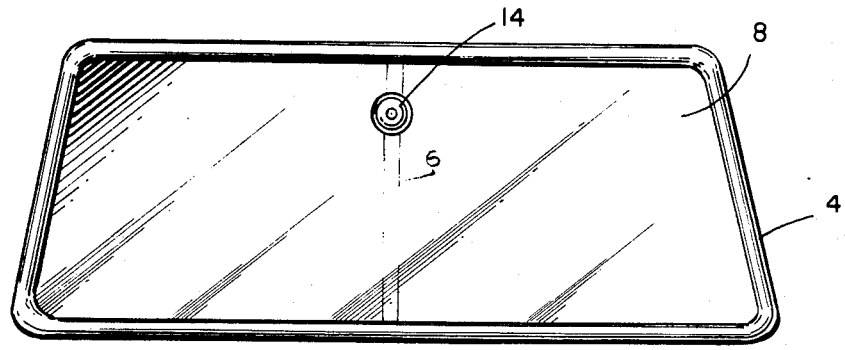
FIG. 1 is a front elevation of an automobile rear view mirror and photocell arranged to actuate the mirror.
Figure 2:
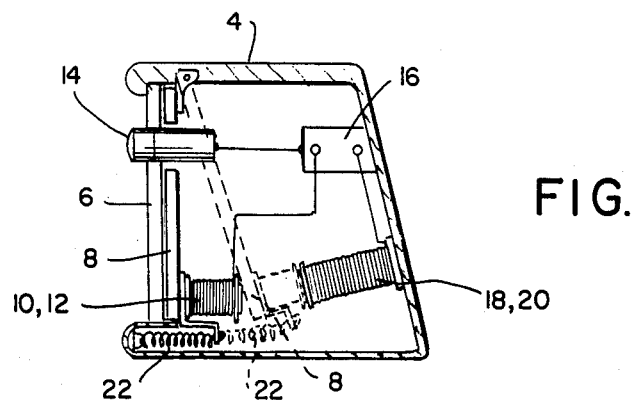
FIG. 2 is a side elevation with the housing broken away of the principal actuating components for the mirror, the mirror shown in tilted position by discontinuous line.
Figure 3:
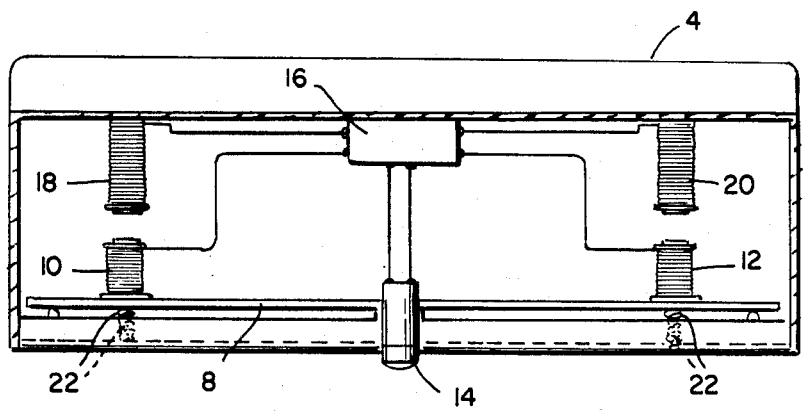
FIG. 3 is a top plan view with the housing broken away of said components.

Referring to the drawings mirror housing 4 holds plastic prism 6 in its forward portion. Mirror 8 is pivoted at a point within and near the top of the housing and carries on its back face a pair of electromagnets 10 and 12.

Supported by the prism is a photocell 14 which actually extends through the pivotal mirror 8 there being formed therein an enlarged hole to allow relative movement between the two components.

A power pack 16 provides amplification of the usual 12 volt auto battery source to energize the two stationary electromagnets 18 and 20 secured to the rear wall of the mirror housing 4 as well as the two moveable electromagnets 10 and 12 attached to the mirror.

In operation it may be seen that on energization of the four electromagnets the mirror will be tilted thereby attenuating the light reflected by the mirror without disturbing the position of the actuating photocell which, therefore, remains in position to detect any change in the incident light which, if inefficient in degree, will cause the mirror to be restored to its normal position. Spring 22 extending between the housing and the mirror is provided to that end.

Various modifications of the invention may be effected by persons skilled in the art without departing from the scope and principle of the invention as defined in the appended claims.

What is claimed is:

1. A mirror system comprising a spring biased pivotal mirror, an electromagnet secured thereto, a stationary electromagnet proximate said first mentioned magnet, a stationary photocell having its light sensitive face disposed directly in front of said mirror and connected to energize said stationary and first mentioned magnets wherein the photocell extends through the plane of said mirror without attachment thereto whereby the cell and mirror are movable relative to one another.

* * * * *